United States Patent [19]

Eggenberger et al.

[11] Patent Number: 4,916,701

[45] Date of Patent: Apr. 10, 1990

[54] METHOD AND SYSTEM FOR CORRECTING LONG BURSTS OF CONSECUTIVE ERRORS

[75] Inventors: John S. Eggenberger, Sunnyvale; Paul Hodges; Arvind M. Patel, both of San Jose, all of Calif.

[73] Assignee: International Business Machines Corporation, Armonk, N.Y.

[21] Appl. No.: 247,461

[22] Filed: Sep. 21, 1988

[51] Int. Cl.[4] ............................................. G06F 11/10
[52] U.S. Cl. .................................. 371/37.7; 371/39.1; 371/40.3
[58] Field of Search .................... 371/37.7, 39.1, 38.1, 371/40.1, 40.3

[56] References Cited

U.S. PATENT DOCUMENTS

| | | | |
|---|---|---|---|
| 4,441,184 | 4/1984 | Sonoda et al. | 371/37.4 |
| 4,486,881 | 12/1984 | de Couasnon | 371/37.7 |
| 4,525,838 | 6/1985 | Patel | 371/37 |
| 4,703,485 | 10/1987 | Patel | 371/37 |
| 4,706,250 | 11/1987 | Patel | 371/39 |
| 4,802,173 | 1/1989 | Baggen | 371/37.6 |

Primary Examiner—Charles E. Atkinson
Attorney, Agent, or Firm—Henry E. Otto, Jr.

[57] ABSTRACT

A method is disclosed for correcting multibyte errors in a magnetic medium on which data is recorded in variable length blocks that comprise subblocks of data bytes and corresponding check bytes and include error correction code (ECC) for which ECC syndromes are generated during reading. A sequence of N sequential parity check bytes is written at the end of each block. After ECC syndromes are generated during reading, parity syndromes are generated by comparing parity check bytes computed from data bytes and check bytes as read with the parity check bytes as written. When a long-burst error occurs, a pointer points to the first of the N consecutive bytes in a block that could have been influenced by the error burst. After correcting correctable errors in all subblocks not affected by the N bytes identified by the pointer, and adjusting the parity syndromes for errors thus corrected, the adjusted parity syndromes are used to correct the errors in the N bytes indicated by the pointer. Unused ECC syndromes are then adjusted for errors corrected by the adjusted parity syndromes and used to correct all correctable errors then remaining.

11 Claims, 2 Drawing Sheets

D = DATA BYTES (VARIABLE)
S = SUBBLOCK CHECK BYTES (6) / SUBBLOCK
C = CRC BYTES (4)
B = BLOCK CHECK BYTES (2)
P = PARITY BYTES (16)

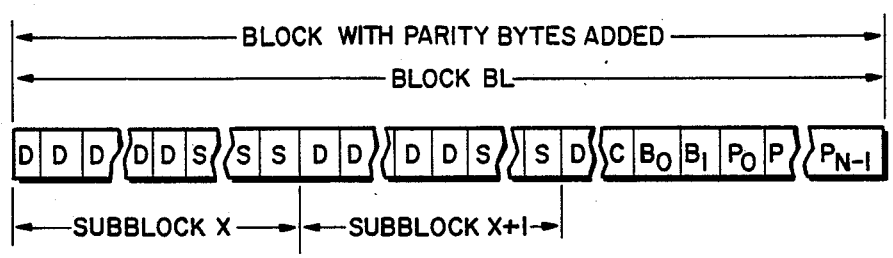
D = DATA BYTES (VARIABLE)
S = SUBBLOCK CHECK BYTES (6) / SUBBLOCK
C = CRC BYTES (4)
B = BLOCK CHECK BYTES (2)
P = PARITY BYTES (16)
FIG. 1
FIG. 2
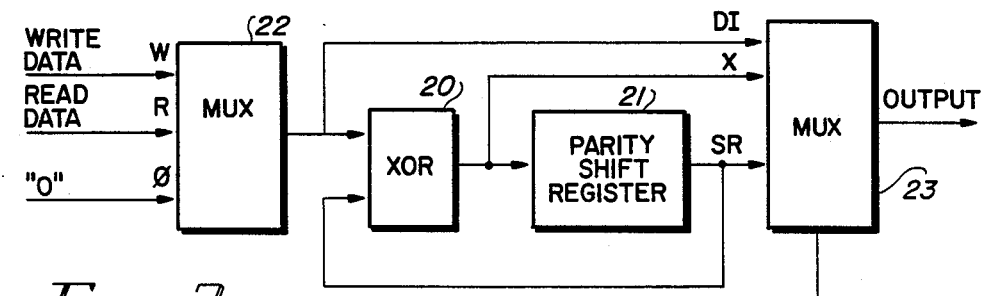
FIG. 3

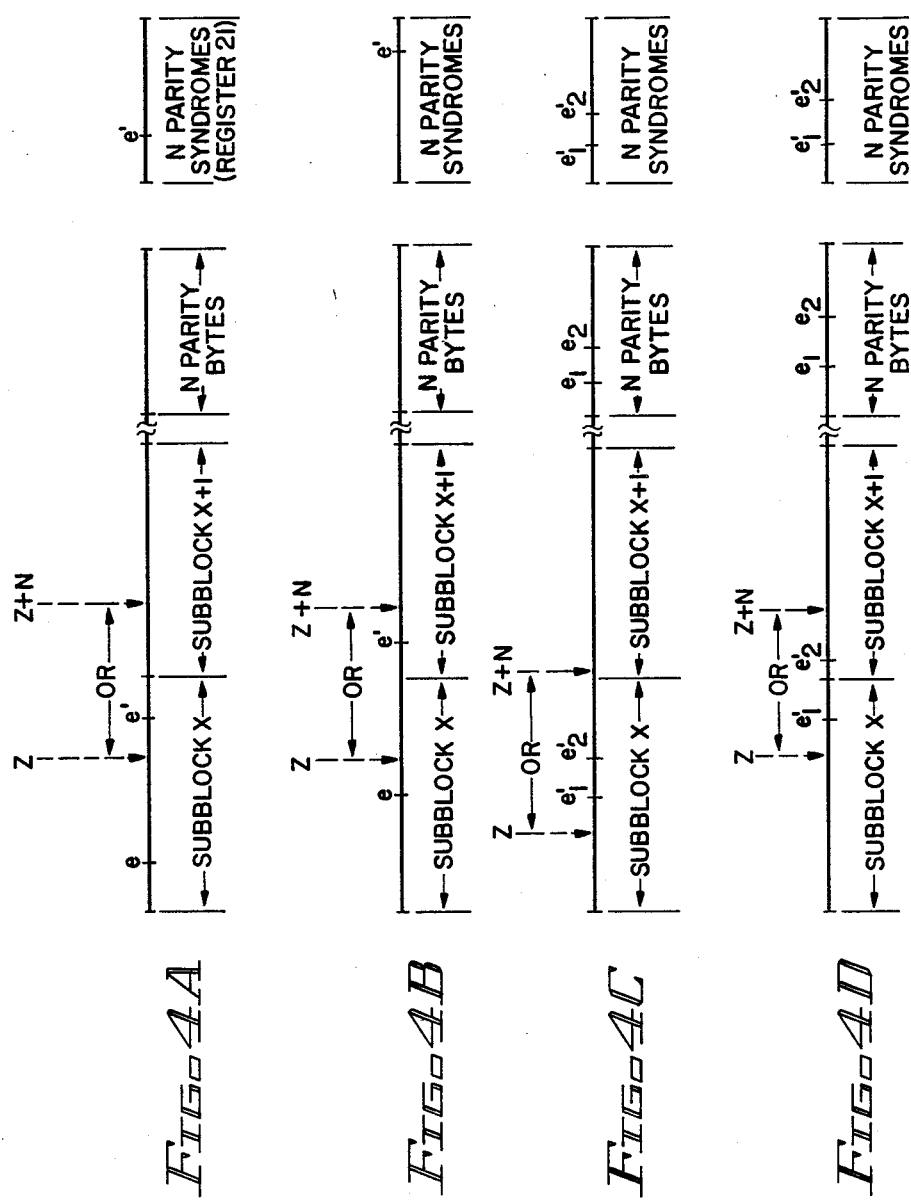

METHOD AND SYSTEM FOR CORRECTING LONG BURSTS OF CONSECUTIVE ERRORS

This invention relates to a method and system for correcting multiple byte errors in data read from a magnetic medium in a count-key-data (CKD) or fixed block (FB) environment with inter-record gaps, and more particularly to a method and system capable of correcting conventional errors using two-level error correction code (ECC) syndromes and also correcting occasional long bursts of consecutive errors due to a major signal perturbation.

BACKGROUND OF THE INVENTION

It is known to correct conventional errors in data read from a magnetic medium by use of a pointer, and check bytes, and one or more parity checks. These error correction code (ECC) error detection and correction functions are carried out on both write and read operations. These methods for accomplishing the error correction vary, depending on where the error is, the correction capability available in the hardware, system error recovery procedures, and the like. The IBM 3380 Models J and K disk files use a two-level ECC to correct errors and are capable of correcting any single burst error involving two successive bytes (16 bits) in each subblock read from the disk and any error involving four successive bytes (32 bits) in one of the subblock in a block. However, there are instances where the duration of a perturbation and resultant error burst may be 16 bytes or more. This is longer than that of a "conventional" error burst and typically so long that it will exceed the correction capability of the two-level ECC heretofore available without creating a very wasteful design.

While the IBM 3850 Mass Storage Device is capable of correcting long-burst errors in data read from a magnetic tape, the method and apparatus used are not capable of correcting both conventional and long-burst errors in a disk file using a two-level ECC.

There is a need for a method and system capable of correcting both conventional errors and long-burst errors of 16 or more consecutive bytes due to a major perturbation of the signal during reading of data from a magnetic medium, such as a magnetic disk.

SUMMARY OF THE INVENTION

Toward this end, and according to the invention, a method and system is disclosed capable of correcting not only convntional errors covered by the two-level ECC but also a long burst of up to N consecutive byte errors in a magnetic disk medium on which data is recorded in form of subblocks within a block of variable or fixed length. These blocks comprise data bytes and check bytes and include ECC for which ECC syndromes are generated during reading. At the end of each block a sequence of N sequential parity check bytes is written. Then, during reading, after the generation of the ECC syndromes, parity syndromes are generated by comparing parity check bytes computed from the data bytes and check bytes as read with the parity check bytes as written. In response to a long-burst error, a pointer is generated to the first of N consecutive bytes in a block that could have been influenced by the error. Then those ECC syndromes not dependent on the N bytes identified by the pointer are used to correct any correctable errors. Following this, the parity syndromes are adjusted according to the errors thus corrected. The adjusted parity syndromes are then used to correct correctable errors in the N bytes indicated by the pointer. Any unused ECC syndromes are adjusted according to the errors thus corrected by the adjusted parity syndromes; whereupon the adjusted ECC syndromes are used to correct all correctable errors then remaining.

BRIEF DESCRIPTION OF THE DRAWINGS

FIG. 1 illustrates a two-level ECC format to which the invention has been applied;

FIG. 2 illustrates how each parity byte is computed from the consecutive ordered sets of N (assume as 16) interleaved data bytes and check bytes in a subblock to form N parity groups; and FIG. 3 illustrates an embodiment of the logic for generating the parity bytes in writing and the parity byte syndromes in reading; and FIGS. 4A, 4B, 4C and 4D illustrate various error conditions under which imaged errors are correctable.

DESCRIPTION OF PREFERRED EMBODIMENT

The method implementing the invention is shown applied to a two-level ECC system of the type disclosed in U.S. Pat. Nos. 4,525,838, 4,703,485 and 4,706,250 constituting improvements thereto. These patents disclose a two-level multibyte error correcting system operable to correct up to $t_1$ errors in each subblock of a block of data and $t_2$ errors in said block, where $t_2 > t_1$.

In the two-level ECC system as described in U.S. Pat. No. 4,706,250 and illustrated in FIG. 1, data is recorded in blocks of variable (or fixed) length each comprising a plurality of subblocks, preferably of the same length except possibly the last. Each subblock comprises a variable (or fixed) number of data bytes and six subblock check bytes S for first level error correction. At the end of the last subblock in the block are four CRC bytes C for data integrity checking, followed by two block check bytes B for second level error correction.

According to the invention, a sequence of N parity check bytes P is written at the end of each block in the gap between it and the succeeding block; i.e. in the inter-block gap. The parity byte $P_0$ immediately follows the last byte of the area; i.e., $B_1$, the last block check byte. As illustrated in FIG. 2, these parity check bytes P make an interleaved parity check across N consecutive ordered groups of data bytes, check bytes and CRC bytes; i.e., all bytes in each ordered group are N bytes apart, and all bytes in the block are counted in determining the displacement in the count/key/data (CKD) area to which the parity bytes are appended. The number N is preselected to equal the longest anticipated burst of consecutive errors so that no single long-burst error can affect more than one byte in any one of the N parity groups. As customary in parity checks, all bytes are exclusively OR'd (XOR'd). As used in this specification and in the claims, the term "byte" is defined as comprising one or more bits.

A pointer is generated in response to an error burst of up to N consecutive bytes to indicate the first of N consecutive bytes in a block that could have been affected by the long-burst. The pointer may be an after-the-fact indication. For example, if it could be sensed that a long-burst error had started no more than ten byte times earlier, then the appropriate earliest byte indication would be ten bytes previous to the byte being read at the time the error was sensed.

In FIG. 2, it is assumed for sake of illustration that N is 16, and that parity bytes $P_0$ through $P_{15}$ are therefore written in order immediately following the last byte (block check byte $B_1$) of the block. Thus, the parity group including $P_0$ is the result of XOR'ing bytes $D_2$, $D_{18}$, $S_0$ of subblock X and $D_{10}$ and $D_{26}$ of subblock Y; and the parity group including $P_{11}$ is the result of XOR'ing bytes $D_{13}$, $D_{29}$ of subblock X and $D_5$, $D_{21}$ of subblock Y and $C_1$.

FIG. 3 depicts an exclusive OR gate (XOR) 20, a parity shift register 21 and multiplexers 22 and 23 each of which is one byte wide. Register 21 has a length of N stages (assumed, as already stated, as 16).

Assume initially that shift register 21 has been reset to zero in conventional manner. To write on a magnetic medium, multiplexers 22 and 23 are conditioned to connect Write Data line W to XOR 20 and gate all bytes BL of each block via Data In line DI and multiplexer 23 to the Output for writing on a selected track of a direct access storage device (not shown). Thus Data In includes all data bytes followed by appropriate check bytes through $B_1$ as illustrated in FIG. 1. At the end of Data In, multiplexers 22 and 23 are conditioned to connect line Φ to XOR 20 and gate the N parity bytes $P_0$ through $P_{15}$ from the parity shift register 21 to the Output via line SR.

To read data from the magnetic medium and calculate the parity byte syndromes, multiplexers 22 and 23 are conditioned to connect Read Data line R to Data In line DI and gate all bytes BL of each block to the Output via line DI. Thereupon, multiplexers 22 and 23 are conditioned to gate the N parity bytes $P_0$ through $P_{15}$ from line R to XOR 20 and gate the output of XOR 20 to the Output via line X.

The resultant output is the BL bytes of the block with the 16 parity byte syndromes appended.

In operation, assume that during reading, there are errors detected, but none are long-burst errors. Under this condition, error correction and verification will be effected conventionally, as explained in the cited prior art using the subblock check, block check and CRC syndromes. At the subblock level up to $t_1$ errors can be corrected and $t_1 + c$ errors detected. Thereafter, at the block level, up to $t_2$ errors are correctable in any one of the subblocks of the block.

If there are more errors than can be corrected, correction is abandoned and the error is treated as uncorrectable. Such structure and mode of operation form no part of the present invention.

Note that in the absence of a long-burst error, the parity bytes need not be read. Hence, under normal conditions, with no long-burst error, preparations for processing the next block can be started without reading the parity bytes. Conventionally this processing is done as the read head passes over the inter-block gap—the area that is left unrecorded for this purpose. According to a feature of this invention the parity bytes will be recorded in this inter-block gap and will be read only if long-burst error recovery is required. Thus long-burst error protection is obtained without increasing the length of the medium required for the check bytes and the inter-block gap. Assume now that, during reading, there are errors detected and that the pointer indicates a long-burst error. Subblock check, block check and CRC syndromes are calculated as in the absence of a long-burst error. Also, the parity bytes are read and the parity byte syndromes are calculated as described above.

According to the invention, if the earliest byte at which the error could have started (and hence the earliest byte which could have been affected by the error) was at displacement Z (See FIG. 4A), then the following steps are performed:

(1) First level correction is applied, as necessary, to all subblocks which could not have been affected by the long-burst error; that is, subblocks which have no data or check bytes in the displacement range Z to Z+N. This correction is done as described in the cited prior art.

(2) Since the CRC and block check byte syndromes have been calculated from erroneous data, they need to be adjusted for each first level correction thus made. This adjustment is described in the cited prior art. Since the parity byte syndromes have also been calculated from erroneous data, they need to be adjusted for each first level correction thus made. This adjustment is done by XOR'ing the error pattern for each byte corrected into the parity byte syndrome for the parity group to which the corrected byte belongs.

(3) Next, long-burst errors are corrected as follows: The parity byte syndromes are overlaid on the data bytes and check bytes covering the N bytes following the byte at displacement Z. This range of displacements is referred to as the parity overlay range OR (FIG. 4A), and is N bytes in length. Each byte in this range is corrected by the XORing the corresponding overlaid parity byte syndrome. Appropriate subblock check byte, block check byte and CRC syndromes are adjusted for these changes in the same way that they were adjusted for changes resulting from first level error correction.

(4) Next, the long-burst-affected subblocks are processed through the two-level ECC algorithm. Note that any conventional errors in these subblocks outside the parity overlay range have contributed to the parity byte syndromes. When the parity byte syndromes were overlaid in step 3, these errors in the parity byte syndromes created errors in the parity overlay range OR as images of the conventional errors. FIGS. 4A-4D illustrate various error conditions under which imaged errors are correctable:

FIG. 4A shows a conventional error e in the affected subblock which becomes a parity error in the corresponding parity group and becomes an image error e' in the long burst area in the overlay range OR. This error pair, the conventional error e and its image error e' in the same subblock, is correctable by second level decoding in the two-level ECC.

FIG. 4B shows the case where the conventional error e and its image error e' appear in adjacent subblocks. In this case the error pair is corrected by the first-level processing of the two adjacent subblocks.

FIG. 4C shows the case where conventional errors $e_1$ and $e'_2$ in the parity bytes appear as image errors $e'_1$ and $e'_2$ in the same subblock. These errors are corrected by decoding the affected subblock through second level correction.

FIG. 4D shows the case where conventional errors $e_1$ and $e_2$ in the parity bytes appear as image errors $e'_1$ and $e'_2$ in adjacent subblocks. These errors are corrected by decoding the affected subblocks through first level correction.

In operation, first-level correction as described above is applied iteratively to the long-burst-affected subblocks until each has been corrected or found non-correctable at first level. If one subblock remains uncorrected after this processing, the block check bytes can be used and second level correction applied as described in the cited prior art.

(5) After all corrections are applied, the correction is verified from the condition of the adjusted CRC syndromes as described in the cited prior art.

The error-correcting capability of the algorithm in this invention can be generally summarized as follows:

A. When long-burst error correction is not required, the correction capability of the two-level code is unaffected.

B. When long-burst error correction is required, the errors can be corrected provided that all of the following conditions are satisfied:

(i) The long-burst is not longer than the parity byte overlay range.

(ii) The conventional errors in each subblock are within the first level capability of the two-level ECC.

(iii) If the long-burst error affects more than one subblock, only one of these long-burst-affected subblocks has conventional errors.

(iv) If the parity bytes are affected by conventional errors, the long-burst-affected subblocks do not have any conventional errors.

Note that N may exceed the length of one subblock without impairing correction capability.

It should also be noted that the two-level ECC structure disclosed in the cited patents could be rstructured to provide N-way (instead of two-way) interleaving of codewords; but, using this approach, the cost to enable correction of up to N consecutive bytes in error in a long-burst error would be prohibitive. With applicants' method and system, however, which involves appending the N parity bytes, up to N consecutive bytes in error can be corrected more cheaply and expeditiously; and the selected value of N can be increased without significant increase in complexity and cost.

While the invention has been described in connection with a preferred embodiment thereof, it will be understood that the foregoing and other changes may be made in the method and system herein disclosed. The embodiment illustrated is therefore to be considered merely illustrative and the invention is not to be considered limited except as specified in the claims.

We claim:

1. A method of correcting multibyte errors in a magnetic medium on which data is recorded in variable length blocks that comprise subblocks of data bytes and corresponding check bytes and include error correction code (ECC) for which ECC syndromes are generated during reading, said method comprising the steps of:
    writing at the end of each block a sequence of N sequential parity check bytes;
    during reading, after the generation of the ECC syndromes, generating parity syndromes by comparing the parity check bytes computed from the data bytes and check bytes as read with the parity check bytes as written;
    in response to a long-burst error condition, generating a pointer to the first of the N consecutive bytes in a block that could have been influenced by the error burst;
    using any ECC syndromes which are not affected by the N bytes identified by the pointer, correcting correctable errors in all subblocks not affected by these identified bytes;
    adjusting the parity syndromes according to the errors thus corrected;
    using the adjusted parity syndromes, correcting the errors in the N bytes indicated by the pointer;
    adjusting an unused ECC syndromes according to the errors corrected by the adjusted parity syndromes; and
    using the adjusted ECC syndromes, correcting all correctable errors then remaining.

2. The method of claim 1, wherein the parity bytes make an interleaved parity check across consecutive ordered groups of N data bytes and check bytes.

3. The method of claim 1, wherein said condition is a long-burst error not exceeding N bytes.

4. The method of claim 1, wherein the blocks are of variable length and comprise a variable number of data bytes and a preselected number of check bytes.

5. The method of claim 1, wherein the parity bytes are written in the gap between adjacent blocks.

6. The method of claim 1, wherein N may exceed the total number of bytes in a subblock.

7. A method of correcting multibyte errors in a magnetic medium on which data is recorded in variable length blocks that comprise subblocks of data bytes and corresponding check bytes and include error correction code (ECC) for which ECC syndromes are generated during reading, said method being operable to correct up to a preselected number of errors in each subblock during processing at a first level of error correction and additional errors in each block during processing at a second level of error correction, said method comprising the steps of:
    writing at the end of each block a sequence of N sequential parity check bytes to create N parity groups from interleaved data bytes and check bytes;
    during reading, after the generation of the ECC syndromes, generating during first level correction parity syndromes by comparing the parity check bytes computed from the data bytes and check bytes as read with the parity check bytes as written;
    in response to a long-burst error condition, generating a pointer to the first of the N consecutive bytes in a block that could have been influenced by the error burst;
    using any ECC syndromes which are not dependent on the N bytes identified by the pointer, correcting any correctable errors during first level correction;
    adjusting the parity syndromes according to the errors thus corrected;
    using the adjusted parity syndromes, correcting the long-burst errors in the N bytes indicated by the pointer;
    adjusting any unused first level ECC syndromes according to the errors corrected by the adjusted parity syndromes; and
    using the adjusted first level ECC syndromes, correcting all first level correctable errors;
    adjusting second level ECC syndromes for all errors thus far corrected; and
    using the adjusted second level ECC syndromes, correcting all correctable errors then remaining.

8. The method of claim 7, including the step of:
    responsive to a conventional error in one of the subblocks that results in a parity error in the corresponding parity group that in turn results in an image error in that parity overlay range N bytes in length as measured from the earliest byte which could have been affected by the conventional error, correcting said conventional error and its image error by decoding during second-level correction.

9. The method of claim 7, including the step of:
responsive to a conventional error and its image error in adjacent subblocks, correcting both errors by first-level correction of said adjacent subblocks.

10. The method of claim 7, including the step of:
responsive to two conventional errors in the parity bytes that create corresponding image errors in adjacent subblocks, correcting the errors by first level correction of said adjacent subblocks.

11. The method of claim 7, including the steps of:
responsive to two conventional errors in the parity bytes that create corresponding image errors in the same subblock, correcting the errors by decoding during second-level correction.

* * * * *